(12) United States Patent
Krumm et al.

(10) Patent No.: US 6,788,818 B1
(45) Date of Patent: Sep. 7, 2004

(54) SYSTEM AND PROCESS FOR OPTIMIZING FALSE ALARM PROBABILITY FOR HISTOGRAM MATCHING

(75) Inventors: John Krumm, Redmond, WA (US); Peng Chang, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/549,077

(22) Filed: Apr. 15, 2000

(51) Int. Cl.[7] .................................................. G06K 9/62
(52) U.S. Cl. ..................... 382/209; 382/170; 382/172; 382/218; 340/297; 340/304; 340/507
(58) Field of Search ............................... 382/159, 160, 382/170, 171, 172, 190, 191, 194, 206, 207, 209, 217, 218, 219, 220, 224, 278, 282, 303; 348/179, 180, 181, 185; 702/2, 3, 19, 32; 340/506, 507, 292, 297, 304

(56) References Cited

U.S. PATENT DOCUMENTS

| | | | | |
|---|---|---|---|---|
| 4,005,415 A | * | 1/1977 | Kossiakoff et al. ........... 342/90 |
| 4,274,095 A | * | 6/1981 | Phipps et al. ................ 342/93 |
| 5,012,251 A | * | 4/1991 | Kennedy et al. ............ 342/176 |
| 5,376,922 A | * | 12/1994 | Kiss ............................ 340/552 |
| 5,552,705 A | * | 9/1996 | Keller ......................... 324/239 |
| 5,583,972 A | * | 12/1996 | Miller ......................... 345/419 |
| 5,608,820 A | * | 3/1997 | Vaidyanathan .............. 382/169 |
| 5,612,928 A | * | 3/1997 | Haley et al. .................. 367/11 |
| 5,937,092 A | * | 8/1999 | Wootton et al. ............. 382/192 |
| 5,956,424 A | * | 9/1999 | Wootton et al. ............. 382/192 |
| 5,971,290 A | * | 10/1999 | Echigoya et al. ...... 237/12.3 B |
| 5,982,944 A | * | 11/1999 | Vaidyanathan et al. ..... 382/271 |
| 6,097,429 A | * | 8/2000 | Seeley et al. ................ 348/154 |
| 6,249,590 B1 | * | 6/2001 | Young et al. ................ 382/103 |
| 6,266,428 B1 | * | 7/2001 | Flanigan ...................... 382/100 |
| 6,272,230 B1 | * | 8/2001 | Hiraoglu et al. ............. 382/100 |
| 6,356,607 B1 | * | 3/2002 | Scott et al. .................. 375/354 |
| 6,553,136 B1 | * | 4/2003 | Keshet et al. ............... 382/135 |
| 6,578,017 B1 | * | 6/2003 | Ebersole et al. ............... 706/3 |

* cited by examiner

Primary Examiner—Bhavesh M. Mehta
Assistant Examiner—Yosef Kassa
(74) Attorney, Agent, or Firm—Lyon & Harr, LLP; Richard T. Lyon (57) ABSTRACT

A system and process that computes the probability of histogram matching false alarms for different settings of a histogram matching algorithm's parameters is presented. This allows the parameters to be adjusted to produce the optimum object finding capability with the lowest possible false alarm rate. Generally, a prototype histogram is generated from a model of an item being sought in an environment. The set of all possible test histograms that can be formed from the environment given a prescribed number of bins and a maximum count for the bins is then determined. Once this is accomplished a subset of test histograms from the set of all possible test histograms which will cause a false alarm is found. Then the probability of occurrence of each individual test histogram that will cause a false alarm in the subset is determined and summed to establish the overall false alarm probability.

27 Claims, 4 Drawing Sheets

SYSTEM AND PROCESS FOR OPTIMIZING FALSE ALARM PROBABILITY FOR HISTOGRAM MATCHING

BACKGROUND OF THE INVENTION

1. Technical Field

This invention relates to a system and method for computing the probability of false alarms when using histogram matching to find objects in images.

2. Background Art

Using histograms for finding objects in images is attractive because histograms are relatively insensitive to an object's pose and scale, background clutter, and partial occlusion. However, this insensitivity is also prone to produce false matches with regions of the background that happen to match the object's histogram well enough, resulting in an algorithm that "finds" an object in an image even when it is not really there. These false alarms can be caused by using too few histogram bins, a subimage for matching so that is too large, or a matching threshold that is too low. Therefore, it is important to be able to quantify the false alarm probability for histogram matching so that intelligent tradeoffs can be made between the aforementioned parameters and the false alarm rate. To date prior histogram matching systems have not had this capability.

It is noted that in the remainder of the specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention overcomes the aforementioned limitations in prior histogram matching systems by a system and method that computes the probability of histogram matching false alarms for different settings of a histogram matching algorithm's parameters. This allows the algorithm's designer to clearly see the tradeoffs and adjust the parameters to produce the optimum capability with the lowest possible false alarm rate. In one embodiment of the present invention, the false alarm rate of histogram matching is exactly computed by listing all the histograms possible as a function of the number of bins and counts, determining those that could cause a false alarm, and summing their probabilities. This exact method is particularly useful because it applies to any method used for comparing histograms. In another embodiment of the system and method according to the present invention, the summed multinomial distribution is approximated by a multivariate normal distribution that is numerically integrated to provide an efficient approximation of the false alarm probability.

The fundamental component of computing a false alarm probability for histogram matching is computing the probability that clutter in a background image will produce a histogram that matches sufficiently well with a model histogram. As will be discussed below, this can be done if an assumption is made about the probability distribution of pixels (or, more generally features) in the background. In particular, it is assumed that the background pixels are independent and identically distributed (iid). Given this assumption, the probability of occurrence of any histogram is given by a multinomial distribution. The system and method according to the present invention provides an exact calculation of false alarm probability for images that are iid, and provides an approximate calculation for image features that are approximately iid.

A histogram may be represented as a vector $H=(h_1, h_2, \ldots, h_m)$. This histogram has m different bins, with $h_i$ being a non-negative integer telling how many counts are in bin i. The bins of the histogram usually represent a set of ranges of pixel values of gray level or color, but they could also be other quantized features. The procedure for computing a histogram is to first quantize the original image into m different values and then histogram this quantized image.

The process of recognizing an object with a histogram starts with a model of the object. A prototype histogram $H_p=(h_{p,1}, h_{p,2}, \ldots, h_m)$ is computed from the model image of the object. A test histogram $H_t=(h_{t,1}, h_{t,2}, \ldots, h_{t,m})$ is computed from an image or subimage that may or may not contain the object. This test histogram may come from a region of the image that is larger, smaller, or the same size as the image used to compute the model histogram. These two histograms are tested for similarity in some way, and if they are similar enough, then the object is declared found in the test image. It is possible to use test images that are the same size as the model images, and therefore only one comparison per image is needed. Or it is possible to scan through the image, extracting several subimages and comparing each of the subimages' histograms to the model histogram. The system and method according to the present invention seeks to compute the probability for matching one of these subimages when that subimage does not represent the object being sought.

There have been several histogram similarity measures proposed. A simple one is the histogram intersection. The intersection tells how many counts in the model histogram the test histogram accounts for. If the intersection exceeds a certain threshold then the histograms are considered similar enough to declare the object found in the image. A convenient threshold is that the test histogram should account for some large fraction of the counts in the model histogram. If the test histogram does account for a large fraction of the counts in the model histogram then the object will be declared found. A false alarm occurs when the intersection equals or exceeds the match threshold when the object does not really exist in the image or portion of the image under consideration. This image or subimage is referred to a background image because it does not contain the object of interest.

The procedure for approximating the false alarm probability is to list the histograms of those background images that cause a false alarm and sum their probabilities of occurrence In order to accomplish this task, it is possible to think of the set of all possible histograms that an image of a given size could produce. Some of these histograms can cause a false alarm. If the total number of possible histograms is small enough, they can all be listed in order to find which ones will cause a false alarm. The probabilities of occurrence of the histograms in this subset can be summed to yield the false alarm probability. For example, every possible histogram computed from an image with n pixels will have n total counts spread among m bins. Each bin will have a nonnegative number of the counts. Thus, for the simple case of a histogram with m=2, the number of possible histograms would be n+1. For example, if the number of pixels n=5, then the six possible histograms are (0,5), (1,4), (2,3), (4,1) and (5,0). For m=3 bins, there are $$\sum_{h_1=0}^{n}\sum_{h_2=0}^{n-h_1} 1 = \frac{1}{2}(n+1)(n+2)$$

possible histograms. Note that the index variables are the histogram counts. For n=5, the 21 possible histograms are

| (0,0,5) | (1,0,4) | (2,0,3) | (3,0,2) | (4,0,1) | (5,0,0) |
| (0,1,4) | (1,1,3) | (2,1,2) | (3,1,1) | (4,1,0) | |
| (0,2,3) | (1,2,2) | (2,2,1) | (3,2,0) | | |
| (0,3,2) | (1,3,1) | (2,3,0) | | | |
| (0,4,1) | (1,4,0) | | | | |
| (0,5,0) | | | | | |

In general, the number of distinct possible histograms with m bins and n counts, may be expressed by the equation:

$$N(m, n) = \frac{1}{(m-1)!}\prod_{i=1}^{m-1}(n+i)$$

and the histograms themselves can be generated from all the index values $(h_1, h_2, \ldots, h_m)$ taken on by running through the following nested sums:

$$\sum_{h_1=0}^{n}\sum_{h_2=0}^{n-h_1}\sum_{h_3=0}^{n-h_1-h_2}\cdots\sum_{h_{m-1}=0}^{n-h_1-h_2-\ldots-h_{m-2}}$$

with $h_m = n - h_1 - h_2 - \ldots - h_{m-1}$.

The paragraphs above gave a technique for listing all possible histograms with m bins and n counts. Next the probability of occurrence of a background histogram $(h_1, h_2, \ldots, h_m)$ is computed. The pixels in the quantized image can take on values of $\{1, 2, \ldots, m\}$, and we say the probability of a single pixel taking on value i is $p_i$. The probability of a given pixel occurring when the probability is summed over all pixels must equal 1; therefore, $$\sum_{i=1}^{m} p_i = 1.$$

It is assumed that the pixels in a background image are independent and identically distributed. The probability of a given histogram occurring can be shown to be given by the multinomial distribution:

$$p(H) = p(h_1, h_2, \ldots, h_m; p_1, p_2, \ldots, p_m, n)$$
$$= \binom{n}{h_1 \ h_2 \ \ldots \ h_m} p_1^{h_1} p_2^{h_2} \ldots p_m^{h_m}$$

Based on the matching criterion employed, some subset $\{H_{false\ alarm}\}$ of all possible background histograms will exceed the matching threshold and produce a false alarm. The probability of a false alarm when matching a model histogram to the histogram of a single test image or subimage is then $$\sum_{i:H_i \in \{H_{false\ alarm}\}} p(H_i).$$

The number of possible histograms grows quickly with the size of the image and the number of quantization levels. The large number of histograms means it is usually impractical to list them all and sum their probabilities as discussed above. Hence, the system and method according to the present invention seeks to approximate the probability in these cases. This is done by integrating a multivariate normal, instead of summing multinomial probabilities, where the mean and covariance of the multivariate normal are the same as the mean and covariance of the multinomial. The probabilities given by the multinomial distribution can be approximated by a multivariate normal with the same mean and covariance as the multinomial. That is, $$p(H) = \binom{n}{h_1 \ h_2 \ \ldots \ h_m} p_1^{h_1} p_2^{h_2} \ldots p_m^{h_m}$$
$$\approx \frac{1}{(2\pi)^{(m-1)/2}|\Sigma|^{1/2}} \exp\left[-\frac{1}{2}(H'-\mu)^T \Sigma^{-1}(H'-\mu)\right]$$
$$= g(H)$$

where H' is a vector of all but the last bin of the histogram H:

$$H' = (h_1, h_2, \ldots, h_{m-1})^T$$
$$\mu = n(p_1, p_2, \ldots, p_{m-1})^T$$

$$\Sigma = [\Sigma_{ij}]_{(m-1)\times(m-1)} = \begin{cases} np_i(1-p_i) & \text{if } i = j \\ -np_i p_j & \text{if } i \neq j \end{cases}$$

$$\Sigma^{-1} = [\tilde{\Sigma}_{ij}]_{(m-1)\times(m-1)} = \begin{cases} \frac{1}{n}\left(\frac{1}{p_i} + \frac{1}{p_m}\right) & \text{if } i = j \\ \frac{1}{np_m} & \text{if } i \neq j \end{cases}$$

$$|\Sigma| = n^{m-1}\prod_{i=1}^{m} p_i$$

For all of the above, $i, j \in \{1, 2, \ldots, m-1\}$.

This approximation assumes that the number of counts in each bin is large. Using this approximation, the system and method according to the present invention computes the false alarm probability by integrating a multivariate normal rather than summing multinomial probabilities.

$$\int_{H \in \{H_{false\ alarm}\}} g(H) dH$$

This can be easier than summing by using efficient numerical approximation techniques for computing the integral. Both Monte Carlo integration and Mathematica's standard numerical integration function have been used in tested embodiments. The integration limits cover those histograms that would cause a false alarm, which is a function of the method used for comparing histograms. One method that gives simple integration limits is the following. For the model or prototype histogram $H_p = (h_{p,1}, h_{p,2}, \ldots, h_{p,m})$ and test histogram $H_t=(h_{t,1}, h_{t,2}, \ldots, h_{t,m})$, it might be said that all the entries in the test histogram have to equal or exceed some large fraction $\alpha: 0<\alpha \leq 1$ of the corresponding entries in the prototype histogram. The set of histograms producing a false alarm is then $$\{H_{false\,alarm}\} = \{H_t : (h_{t,1} \geq \alpha h_{p,1}) \wedge (h_{t,2} \geq \alpha h_{p,2}) \wedge \ldots \wedge (h_{t,m} \geq \alpha h_{p,m})\}$$

The false alarm probability can then be approximated by $$\int_{\alpha h_{p,1}-0.5}^{\infty} \int_{\alpha h_{p,2}-0.5}^{\infty} \ldots \int_{\alpha h_{p,m-1}-0.5}^{\infty} g(H) dh_1 dh_2 \ldots dh_{m-1}$$

The foregoing analysis can be used to adjust the parameters of an object recognition algorithm that uses histogram matching, or any other application that uses histogram matching. The false alarm rate is ultimately a function of the algorithm's parameters (e.g. window size, number of bins). The system and method according to the present invention can be used to compute the false alarm rate for any setting of parameters. The parameters are then adjusted to bring the false alarm rate down to an acceptable level.

As discussed above, the above exact multinomial and approximation methods of determining false alarm probabilities work well when the probability distribution of pixels (or, more generally features) in the background of the image are independent and identically distributed (iid). However, it is also possible for the system and method according to the present invention to accurately predict histogram matching false alarm probabilities for non-iid images. This may be done by distorting the image to make it more iid-like and then using the system and method according to the present invention to determine the optimum parameters to be used in the histogram matching for the iid converted image.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Figure 1:
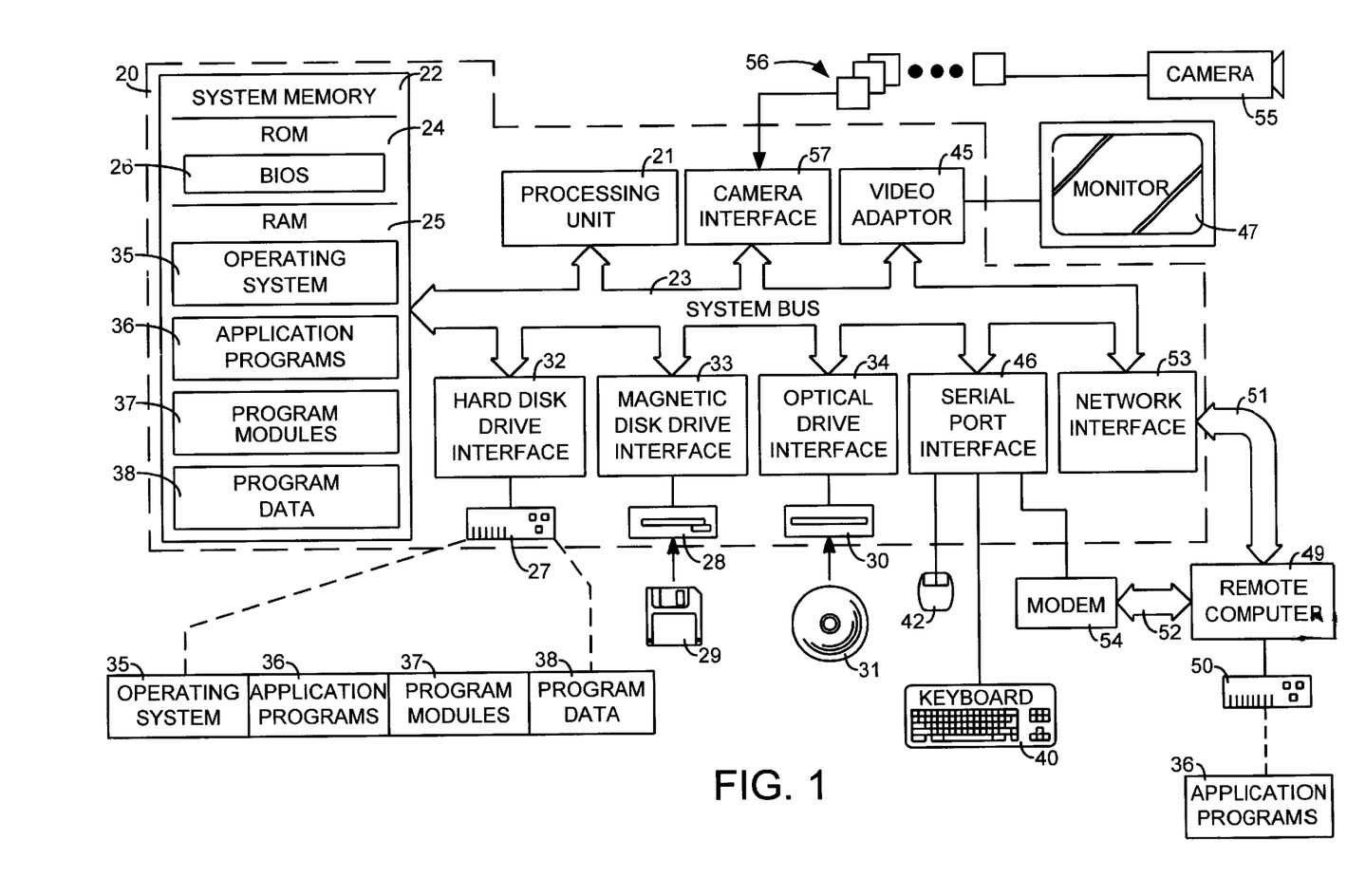
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data

38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining parts of this description section will be devoted to a description of the program modules embodying the invention.

An effective method for finding objects in images is histogram comparison, which was popularized by Swain and Ballard[1]. The essence of the method is to compare a model histogram of the object in isolation to the histogram of an image whose contents are unknown. For object detection, Swain and Ballard [1] compare whole images based on the images' histograms. Vinod and Murase[2] demonstrate an effective object recognition algorithm that scans an image whose contents are unknown to find a subimage that matches the histogram of a known object. In general, the bins of the histograms may represent regions in color space, as did Swain and Ballard's, and they may also represent gray levels, cooccurrences in color pixels, or any small feature that can be quantized into ranges.

Histograms are attractive because they are insensitive to rotation in the image plane and not overly sensitive to out-of-plane rotation, scale change, partial occlusion, and background clutter. Unfortunately, this lack of sensitivity can go too far, resulting in an algorithm that "finds" an object in an image even when it is not really there. These false alarms can be caused by a quantization that is too coarse (too few histogram bins), a subimage for matching that is too large, or a matching threshold that is too low. The system and method according to the present invention computes the probability of these false alarms for different settings of an algorithm's parameters, which allows the algorithm's designer to clearly see the tradeoffs and set the parameters accordingly.

The fundamental component of computing a false alarm probability for histogram matching is computing the probability that clutter in a background image will produce a histogram that matches sufficiently well with a model histogram. To do this the system and method according to the present invention makes an assumption about the probability distribution of pixels (or, more generally, features) in the background. In particular, it is assumed that the background pixels are independent and identically distributed (iid). Given this assumption, the probability of occurrence of any histogram is given by a multinomial distribution. The system and method according to the present invention provides an essentially exact calculation of false alarm probability for images that are iid, and an approximately correct calculation for image features that are approximately iid.

The probability of a false alarm is the sum of the probabilities of occurrence of all the background histograms that would cause a false alarm. This analysis applies to any method used for comparing histograms, and the system and method according to the present invention applies to the histogram intersection method proposed by Swain and Ballard [1], among other methods. In a real imaging application there are typically too many probabilities to compute and sum in a reasonable amount of time. The system and method according to the present invention resolves this problem by replacing the multinomial distribution with a multivariate normal distribution and replaces the summing with numerical integration of the normal distribution for an efficient approximation of the false alarm probability. Examples of the system and method according to the present invention using the exact analysis and the approximate analysis to two real images are shown in later paragraphs.

Figure 2:
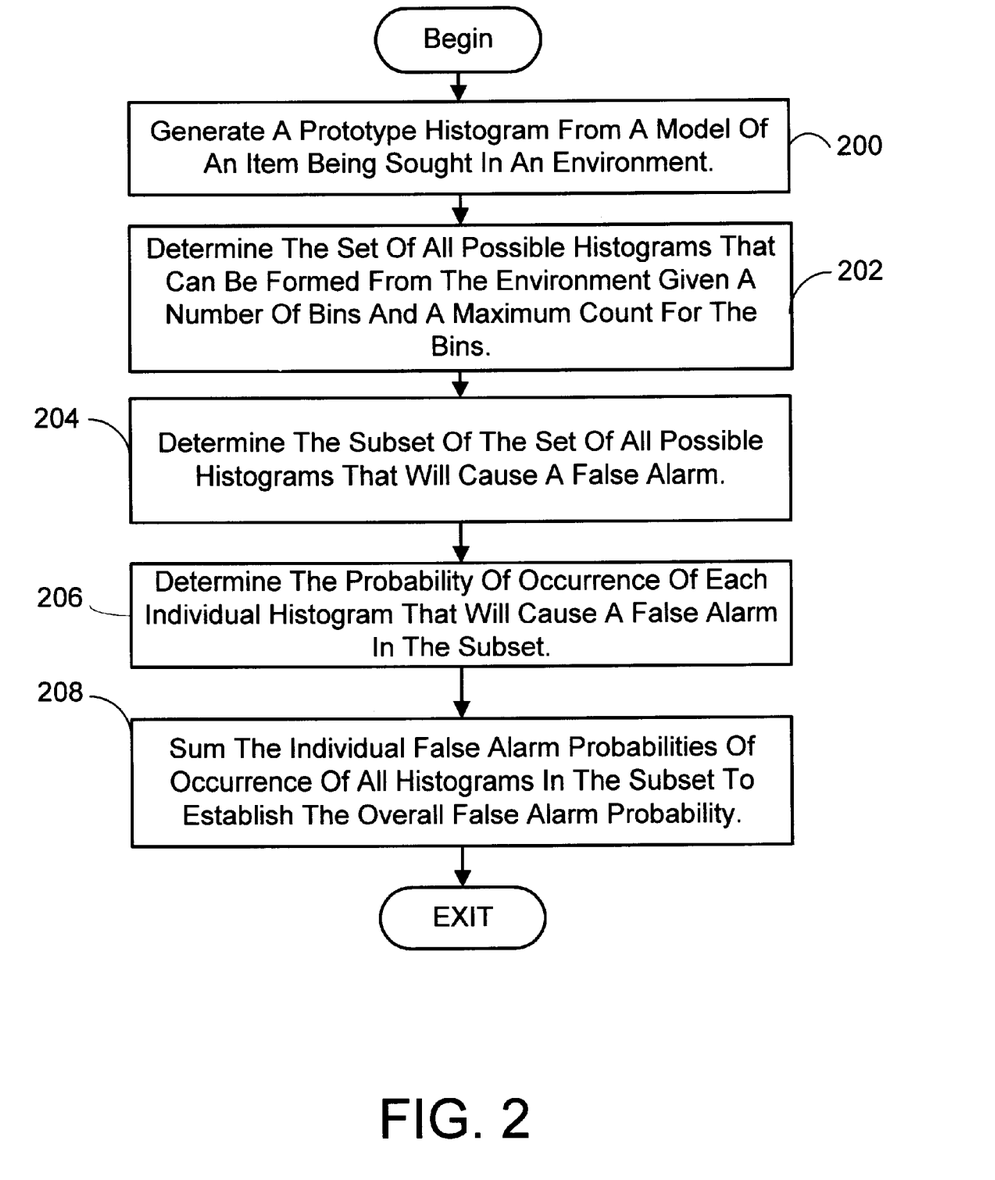
FIG. 2 is a flow diagram of a method of determining the overall false alarm probability when using histogram matching.

The system and method according to the present invention determines the overall false alarm probability when using histogram matching as shown in FIG. 2. Once the false alarm probability has been calculated using one set of parameters, it may be optimized by using a different set of parameters such as histogram bin numbers, subimage (window) size used in the matching process, and matching threshold. These parameters will be discussed in greater detail later. As shown in FIG. 2, the system and method according to the present invention begins the process of calculating the false alarm probability by generating a prototype or model histogram from a model of an item being sought in an environment, such as for example an image, as shown in process action 200. Then, in process action 202, the system and method according to the present invention determines the set of all possible histograms that can be formed from the environment given a number of bins and maximum count. Once the set of all possible histograms is found, the subset of these that will cause a false alarm is determined (process action 204). The probability of occurrence of each individual histogram in the subset is then found (process action 206) and the sum of these probabilities is calculated to establish the overall false alarm probability (process action 208).

1.0 THEORY

This section gives the basic theory for computing the false alarm probability for histogram matching. A simple example of the computation is given in the next section.

A histogram may be represented as a vector $H=(h_1, h_2, \ldots, h_m)$. This histogram has m different bins, with $h_i$ being a non-negative integer telling how many counts are in bin i. The bins of the histogram usually represent a disjoint set of ranges of pixel values of gray level or color, but they could also be higher-level features like the cooccurrence of color pixels or small, quantized features. The procedure for computing a histogram is to first quantize the original image into m different values and then histogram this quantized image.

1.1 What Causes a False Alarm

Recognizing an object with a histogram starts with a model of the object. This prototype histogram $H_p=(h_{p,1}, h_{p,2}, \ldots, h_{p,m})$ is computed from a model image of the object. A test histogram $H_t=(h_{t,1}, h_{t,2}, \ldots, h_{t,m})$ is computed from an image or subimage that may or may not contain the object. This test histogram may come from a region of the image that is larger, smaller, or the same size as the image used to compute the model histogram. These two histograms are tested for similarity in some way, and if they are similar enough, then the object is declared found in the image. In one of their tests, Swain and Ballard [1] use test images that are the same size as the model images, and therefore only one comparison per image is needed. Vinod and Murase [2] scan through the image, extracting several subimages and comparing each of the subimages' histograms to the model histogram. The system and method according to the present invention computes the false alarm probability for matching one of these subimages.

There have been several histogram similarity measures proposed. A simple one used by Swain and Ballard [1] is the histogram intersection:

$$I_{p,t} = \sum_{i=1}^{m} \min(h_{p,t}, h_{t,t})$$

The intersection tells how many counts in the model histogram the test histogram accounts for. If the intersection exceeds a certain threshold, then the histograms are considered similar enough to declare the object found in the image. A convenient threshold is that the test histogram should account for some large fraction $\alpha: 0 < \alpha \leq 1$ of the counts in the model histogram. Then the object will be declared found if $I_{p,t} \geq \alpha I_{p,p}$, where $I_{p,p}$ is simply the sum of all the counts in the model histogram.

A false alarm occurs when the intersection $I_{p,t}$ equals or exceeds the match threshold when the object does not really exist in the test image. This image is referred to as a background image, because it does not contain the object of interest. The set of background images that produce false alarms is represented by $$\{H\}_{false\,alarm} = \{H_t : I_{p,t} \geq \alpha I_{p,p}\}$$

This is a set of histograms that all match the model histogram well enough to be mistaken for the model histogram.

1.2 The Set of All Histograms

The procedure for approximating the false alarm probability is to list those background images that cause a false alarm and sum their probabilities. The set of all possible histograms can be thought of as all that a background image of a given size could produce. Some of these histograms will cause a false alarm. If the probabilities of occurrence of all those histograms that could cause a false alarm are summed, the false alarm probability is produced.

If the total number of possible histograms is small enough, they can all be listed in order to find which ones will cause a false alarm. This section shows how to generate a list of all possible histograms, given the number of bins and number of pixels n. Every possible histogram computed from an image with n pixels will have n total counts spread among m bins. Each bin will have a non-negative number of counts. Thus $h_{t,0}+h_{t,1}+ \ldots +h_{t,m}=n$, which describes a hyperplane in m dimensions. Since the bins' counts are all non-negative, the histogram must exist on the hyperplane in the space's all-positive quandrant. The system and method according to the present invention develops the procedure for generating all possible histograms by starting with the simple case of a histogram with m=2 bins and working up. For m=2, the number of possible histograms is n+1. For example, if n=5, then the 6 possible histograms are (0,5), (1,4), (2,3), (3,2), (4,1), and (5,0).

For m=3 bins, there are $$\sum_{h_1=0}^{n} \sum_{h_2=0}^{n-h_1} 1 = \frac{1}{2}(n+1)(n+2)$$

possible histograms. Note that the index variables are the histogram counts. For n=5, the 21 possible histograms are

| | | | | | |
|---|---|---|---|---|---|
| (0,0,5) | (1,0,4) | (2,0,3) | (3,0,2) | (4,0,1) | (5,0,0) |
| (0,1,4) | (1,1,3) | (2,1,2) | (3,1,1) | (4,1,0) | |
| (0,2,3) | (1,2,2) | (2,2,1) | (3,2,0) | | |
| (0,3,2) | (1,3,1) | (2,3,0) | | | |
| (0,4,1) | (1,4,0) | | | | |
| (0,5,0) | | | | | |

In general, for m bins and n pixels, the number of possible distinct histograms is $$N(m,n) = \sum_{h_1=0}^{n} \sum_{h_2=0}^{n-h_1} \sum_{h_3=0}^{n-h_1-h_2} \ldots \sum_{h_{m-1}=0}^{n-h_1-h_2-\ldots-h_{m-2}} \quad (1)$$

and the histograms themselves can be generated from all the index values $(h_1, h_2, \ldots, h_m)$ taken on by running through the following nested sums:

$$\sum_{h_1=0}^{n} \sum_{h_2=0}^{n-h_1} \sum_{h_3=0}^{n-h_1-h_2} \ldots \sum_{h_{m-1}=0}^{n-h_1-h_2-\ldots-h_{m-2}} . \quad (2)$$

with $h_m = n - h_1 - h_2 - \ldots - h_{m-1}$.

Equation (1) can be simplified by noticing the pattern that develops in the following table:

| m | N(m,n) | Simplified N(m,n) |
|---|---|---|
| 2 | $\sum_{h_1=0}^{n} 1$ | $(n+1)$ |
| 3 | $\sum_{h_1=0}^{n} \sum_{h_2=0}^{n-h_1} 1$ | $\frac{1}{2}(n+1)(n+2)$ |
| 4 | $\sum_{h_1=0}^{n} \sum_{h_2=0}^{n-h_1} \sum_{h_3=0}^{n-h_1-h_2} 1$ | $\frac{1}{6}(n+1)(n+2)(n+3)$ |
| 5 | $\sum_{h_1=0}^{n} \sum_{h_2=0}^{n-h_1} \sum_{h_3=0}^{n-h_1-h_2} \sum_{h_4=0}^{n-h_1-h_2-h_3} 1$ | $\frac{1}{24}(n+1)(n+2)(n+3)(n+4)$ |

It can informally be induced that for m bins and n counts, there are N(m,n) possible histograms, with $$N(m,n) = \frac{1}{(m-1)!} \prod_{i=1}^{m-1} (n+i) \quad (3)$$

An inductive proof of this equation is as follows. For m=2 bins, there are clearly n+1 possible histograms, because the first bin can have a count in the range [0,1,2, ..., n] and the remaining counts have to go into the second bin. It is $$N(2,n) = \frac{1}{1!} \prod_{i=1}^{1} (n+i) = n+1,$$

step of the induction proof, i.e. N(2,n)=n+1.

For the second step of the inductive proof, N(m+1,n) is derived by assuming that Equation (3) is true for N(m,n). If this is equal to N(m+1,n) as given by Equation (3), then the proof is complete. For m bins and n counts there are N(m,n) possible histograms. If another bin is added to get m+1 bins, then the new bin can have counts in the range [0,1,2, ..., n]. If the new bin gets j counts, then the remaining m bins get the left over n−j counts. The remaining m bins can be thought of as an m-bin histogram with n−j counts. Then, assuming Equation (3) is true for N(m,n), the number of possible histograms is $$N(m+1,n) = \sum_{j=0}^{n} N(m,n) \quad (3.1)$$

$$= \frac{1}{(m-1)!} \sum_{j=0}^{n} \prod_{i=1}^{m-1} (j+i)$$

$$= \frac{1}{(m-1)!} \sum_{j=0}^{n} \frac{(j+m-1)!}{j!}$$

$$\sum_{j=0}^{n} \frac{(j+a)!}{j!} = \frac{(a+n+1)!}{(a+1)n!} \quad (3.2)$$

Using (3.2) to replace the sum in the last line of (3.1) gives $$N(m+1,n) = \frac{1}{(m-1)!} \frac{(m+n)!}{m!n!} \quad (3.3)$$

$$= \frac{1}{m!} \prod_{i=1}^{m} (n+i)$$

This is what we would get if we replaced m by m+1 on the right side of Equation (3), which completes the proof.

To prove Equation (3.2), the inductive proof is begun by pointing out that Equation (3.2) is true for n=0, where both the left and right sides evaluate to $\alpha!$. Now it is assumed (3.2) is true for n and replace n with n+1 on the left side.

$$\sum_{j=0}^{n+1} \frac{(j+a)!}{j!} = \frac{(a+n+1)!}{(a+1)n!} + \frac{(a+n+1)!}{(n+1)!}$$

$$= \frac{(a+n+1)![(n+1)! + (a+1)n!]}{(a+1)n!(n+1)!}$$

$$= \frac{(a+n+1)!n![(n+1) + (a+1)]}{(a+1)n!(n+1)!}$$

$$= \frac{(a+n+2)!}{(a+1)(n+1)!}$$

Replacing n with n+1 on the right side of (3.2) gives the same result, which completes the proof.

1.3 Probability of a Histogram

The subsection above gave a technique for listing all possible histograms with m bins and n counts. To compute the false alarm probability, the subset of these histograms that would produce a false alarm is taken and their probabilities are summed. This subsection shows how to compute the probability of one of these histograms.

To compute the probability of occurrence of the background histogram $(h_1, h_2, \ldots, h_m)$ it can be stated that the pixels in the quantized image can take on values of $\{1, 2, \ldots, m\}$, and the probability of a single pixel taking on value i is $p_i$, where $$\sum_{i=1}^{m} p_i = 1.$$

It is assumed that the pixels in a background image are independent and identically distributed. The probability of occurrence of an image whose histogram is $(h_1, h_2, \ldots, h_m)$ is $$p_1^{h_1} p_2^{h_2} \ldots p_m^{h_m} = \prod_{i=1}^{m} p_i^{h_i}.$$

The same histogram can be produced from $$\binom{n}{h_1 \ h_2 \ \ldots \ h_m} = \left(\frac{n!}{h_1! h_2! \ldots h_m!}\right)$$

different images by rearranging the locations of the pixels. Thus the probability of a given histogram is given by the multinomial distribution:

$$p(H) = p(h_1, h_2, \ldots, h_m; p_1, p_2, \ldots, p_m, n) \quad (4)$$

-continued $$= \begin{pmatrix} n \\ h_1 \ h_2 \ \ldots \ h_m \end{pmatrix} p_1^{h_1} p_2^{h_2} \ldots p_m^{h_m}$$

1.4 Probability of a False Alarm

Based on the matching criterion, some subset $\{H_{false\ alarm}\}$ of all possible background histograms will exceed the matching threshold and produce a false alarm. The probability of a false alarm when matching a prototype histogram to the histogram of a single test subimage is then $$\sum_{cH_i \in \{H_{false\ alarm}\}} p(H_i) \quad (5)$$

with $p(H_i)$ from Equation (4).

2.0 SIMPLE EXAMPLES

To search for an object in a gray level image, where the image has been quantized to m=3 levels, {1,2,3}, a test window size of 2×2 may be chosen since it is known that is the size of the object. Its histogram is $H_p=(0,1,3)$. A match is declared if a 2×2 test histogram from the image accounts for three of the four pixels in the model histogram. Thus, the match criterion is the histogram intersection:

$$I_{p,t} = \sum_{i=1}^{m} \min(h_{p,i}, h_{t,i})$$

If $I_{p,t} \geq 3$, it is declared that the object has been found in the test window. It can be supposed that the probabilities of the m=3 gray levels occurring in the background are $(p_1, p_2, p_3)=(0.3, 0.5, 0.2)$. Then, for example, the probability of $H_p=(0,1,3)$ occurring at a particular location in the background is $$\begin{pmatrix} n \\ h_{p,1} h_{p,2} \ldots h_{p,m} \end{pmatrix} p_1^{h_{p,3}} p_2^{h_{p,2}} \ldots p_m^{h_{p,m}} = \left(\frac{4!}{0!1!3!}\right)(0.3^0)(0.5^1)(0.2^3) = 0.016$$

Table 1 give a list of all N(3,4)=15 possible background histograms and their associated probabilities. That is, Table 1 lists the possible 3-bin histograms on a 4 pixel image, their probabilities and their intersections with H=(0,1,3). The last column copies the probabilities of those histograms that would cause a false alarm. The histograms with their probability copied into the right-most column are those whose intersection with the model histogram equal or exceed the match threshold of three.

TABLE 1

| $h_1$ | $h_2$ | $h_3$ | p(H) | I(H,(0,1,3)) | p(H) |
|---|---|---|---|---|---|
| 0 | 0 | 4 | 0.0016 | 3 | 0.0016 |
| 0 | 1 | 3 | 0.0160 | 4 | 0.0160 |
| 0 | 2 | 2 | 0.0600 | 3 | 0.0600 |
| 0 | 3 | 1 | 0.1000 | 2 | |
| 0 | 4 | 0 | 0.0625 | 1 | |
| 1 | 0 | 3 | 0.0096 | 3 | 0.0096 |
| 1 | 1 | 2 | 0.0720 | 3 | 0.0720 |
| 1 | 2 | 1 | 0.1800 | 2 | |
| 1 | 3 | 0 | 0.1500 | 1 | |
| 2 | 0 | 2 | 0.0216 | 2 | |
| 2 | 1 | 1 | 0.1080 | 2 | |

TABLE 1-continued

| $h_1$ | $h_2$ | $h_3$ | p(H) | I(H,(0,1,3)) | p(H) |
|---|---|---|---|---|---|
| 2 | 2 | 0 | 0.1350 | 1 | |
| 3 | 0 | 1 | 0.0216 | 1 | |
| 3 | 1 | 0 | 0.0540 | 1 | |
| 4 | 0 | 0 | 0.0081 | 0 | |
| | | | 1.0000 | | 0.1592 |

Summing up the probabilities of the histograms that equal or exceed the intersection threshold, we see that the false alarm probability is 0.1592.

One parameter that it may be desired to adjust in this example is the size of the test window. Above the false alarm probability for a test window that is the same size as the model window was computed. Faster search performance can be obtained if a larger test window is used, presumably at the expense of a greater false alarm probability. Continuing the example with a test window of size 2×3 (n=6), Table 2 gives all N(3,6)=28 possible histograms in the same format as Table 1. The false alarm rate has gone up to 0.8463, an increase of over 500%, with an increase in test window size of only 50%.

TABLE 2

| $h_1$ | $h_2$ | $h_3$ | p(H) | I(H,(0,1,3)) | p(H) |
|---|---|---|---|---|---|
| 0 | 0 | 6 | 0.0156 | 3 | 0.0156 |
| 0 | 1 | 5 | 0.0375 | 4 | 0.0375 |
| 0 | 2 | 4 | 0.0375 | 4 | 0.0375 |
| 0 | 3 | 3 | 0.0200 | 4 | 0.0060 |
| 0 | 4 | 2 | 0.0060 | 3 | 0.0060 |
| 0 | 5 | 1 | 0.0010 | 2 | |
| 0 | 6 | 0 | 0.0001 | 1 | |
| 1 | 0 | 5 | 0.0563 | 3 | 0.0563 |
| 1 | 1 | 4 | 0.1125 | 4 | 0.1125 |
| 1 | 2 | 3 | 0.0900 | 4 | 0.0900 |
| 1 | 3 | 2 | 0.0360 | 3 | 0.0360 |
| 1 | 4 | 1 | 0.0072 | 2 | |
| 1 | 5 | 0 | 0.0006 | 1 | |
| 2 | 0 | 4 | 0.0844 | 3 | 0.0844 |
| 2 | 1 | 3 | 0.1350 | 4 | 0.1350 |
| 2 | 2 | 2 | 0.0810 | 3 | 0.0810 |
| 2 | 3 | 1 | 0.0216 | 2 | |
| 2 | 4 | 0 | 0.0022 | 1 | |
| 3 | 0 | 3 | 0.0675 | 3 | 0.0675 |
| 3 | 1 | 2 | 0.0810 | 3 | 0.0810 |
| 3 | 2 | 1 | 0.0324 | 2 | |
| 3 | 3 | 0 | 0.0043 | 1 | |
| 4 | 0 | 2 | 0.0304 | 2 | |
| 4 | 1 | 1 | 0.0243 | 2 | |
| 4 | 2 | 0 | 0.0049 | 1 | |
| 5 | 0 | 1 | 0.0073 | 1 | |
| 5 | 1 | 0 | 0.0029 | 1 | |
| 6 | 0 | 0 | 0.0007 | 0 | |
| | | | 1.0000 | | 0.8463 |

3.0 APPROXIMATION

In some instances, considering all possible histograms for typical values of m and n can be impractical. For instance, in one of their first reported experiments, Swain and Ballard use a histogram with m=2048 bins (color) from an image of size n=128×90=11,520. $N(2048, 11520) \approx 10^{2497.6}$, which is much larger than $10^{80}$, the number of atoms in the universe. Even small values of m and n give impractically many histograms, e.g. $N(10, 100) \approx 4.26 \times 10^{12}$, which is the number of possible 10-bin histograms from a 10×10 image.

Thus, the number of possible histograms grows quickly with the size of the image and the number of quantization levels. The large number of histograms means it is usually impractical to list them all and sum their probabilities as was done in the examples above. In this section a method of approximating the probability is introduced. This replaces summing multinomial probabilities with integrating a multivariate normal.

The probabilities given by the multinomial distribution in Equation (4) can be approximated by a multivariate normal with the same mean and covariance as the multinomial. That is, $$p(H) = \binom{n}{h_1 \ h_2 \ \ldots \ h_m} p_1^{h_1} p_2^{h_2} \ldots p_m^{h_m} \approx \quad (6)$$

$$\frac{1}{(2\pi)^{(m-1)/2}|\Sigma|^{1/2}} \exp\left[-\frac{1}{2}(H'-\mu)^T \Sigma^{-1}(H'-\mu)\right] = g(H)$$

where the mean and covariance of the multivariate normal are the same as the mean and covariance of the multinomial [3], and H' is a vector of all but the last bin of the histogram H:

$$H' = (h_1, h_2, \ldots, h_{m-1})^T \quad (7)$$

$$\mu = n(p_1, p_2, \ldots, p_{m-1})^T$$

$$\Sigma = [\Sigma_{ij}]_{(m-1)\times(m-1)} = \begin{cases} np_i(1-p_i) & \text{if } i = j \\ -np_i p_j & \text{if } i \neq j \end{cases}$$

$$\Sigma^{-1} = [\check{\Sigma}_{ij}]_{(m-1)\times(m-1)} = \begin{cases} \frac{1}{n}\left(\frac{1}{p_i} + \frac{1}{p_m}\right) & \text{if } i = j \\ \frac{1}{np_m} & \text{if } i \neq j \end{cases}$$

$$|\Sigma| = n^{m-1} \prod_{i=1}^{m} p_i$$

For all of the above, $i, j \in \{1, 2, \ldots, m-1\}$.

The approximation used above was derived in [3] assuming that the number of counts in each bin is large. It is argued for the plausibility of this approximation with a small numerical experiment. For different combinations of the number of bins m and number of counts n, 1000 random m-length probability vectors and 1000 random histograms were generated. Their probabilities were evaluated using the exact multinomial distribution and the multivariate normal approximation above. Then the rms error was computed for the 1000 random samples revealing that the error drops quickly to extremely small values as the number of bins and counts increases. Using this approximation, we can compute the false alarm probability by integrating a multivariate normal rather than summing multinomial probabilities as in Equation (5). The false alarm probability becomes, approximately, $$\int_{H \in \{H_{false\ alarm}\}} g(H) dH \quad (8)$$

This can be easier than summing by using efficient numerical approximation techniques for computing the integral. For experiments, both Monte Carlo integration and Mathematica's® standard numerical integration functions have been tried.

The integration limits cover those histograms that would cause a false alarm, which is a function of the method used for comparing histograms. Histogram intersection gives ragged integration limits that are not easy to express precisely in any form other than a list. The analysis is simplified by using rectilinear integration limits in histogram space. One method that gives simple integration limits is the following. For the prototype histogram $H_p = (h_{p,1}, h_{p,2}, \ldots, h_{p,m})$ and test histogram $H_t = (h_{t,1}, h_{t,2}, \ldots, h_{t,m})$, it might be said that all the entries in the test histogram have to equal or exceed some large fraction $\alpha: 0 < \alpha \leq 1$ of the corresponding entries in the prototype histogram. The set of histograms producing a false alarm is then $$\{H_{false\ alarm}\} = \{H_t : (h_{t,1} \geq \alpha h_{p,1}) \wedge (h_{t,2} \geq \alpha h_{p,2}) \wedge \ldots \wedge (h_{t,m} \geq \alpha h_{p,m})\} \quad (9)$$

The false alarm probability is then approximated by $$\int_{\alpha h_{p,1}-0.5}^{\infty} \int_{\alpha h_{p,2}-0.5}^{\infty} \ldots \int_{\alpha h_{p,m-1}-0.5}^{\infty} g(H) dh_1 dh_2 \ldots dh_{m-1} \quad (10)$$

4.0 HISTOGRAM MATCHING IN NON-IID IMAGES

As discussed above, the above exact multinomial and approximation methods of determining false alarm probabilities work well when the probability distribution of pixels (or, more generally features) in the background of the image are independent and identically distributed (iid). However, it is also possible for the system and method according to the present invention to accurately predict histogram matching false alarm probabilities for non-iid images. This may be done by distorting the image to make it more iid-like and then using the system and method according to the present invention to determine the optimum parameters to be used in the histogram matching for the iid converted image.

5.0 TEST OF EXACT AND APPROXIMATE ANALYSIS

Both the exact and approximate methods of computing false alarm probabilities can be verified on real image data. Since most normal images violate the assumption about the pixels being iid, the methods were tested on a synthetically generated iid image as well as on a rank-transformed version of a real image. The rank-transformed image was closer to iid than the original. The test was based on the three images in FIGS. 3A–3C. All three images are the same size, (height×width)=(595×383). The center image's pixels have values $\{1,2,3,4\}$ and are iid with probabilities $(p_1, p_2, p_3, p_4) = (0.132, 0.315, 0.242, 0.310)$. The right-most image in the figure is a four-value rank transformed version of the left image. The rank transform was computed by extracting all overlapping, 2×2 windows from the original, black and white image. The pixels in each window were sorted into one of the 4!=24 possible ranking orders. That is, if the window's pixels are

Figure 3A:
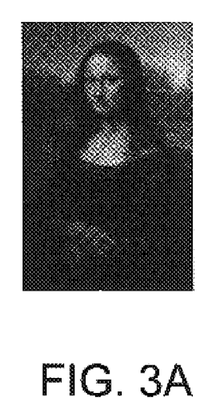
FIG. 3A depicts images used for testing false alarm probability computations, a black and white image version of a famous painting.
Figure 3B:
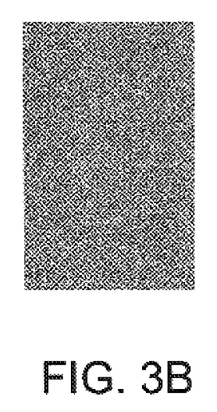
FIG. 3B depicts images used for testing false alarm probability computations, a four value image of independent, identically distributed pixels, based on the image shown in FIG. 3A.
Figure 3C:
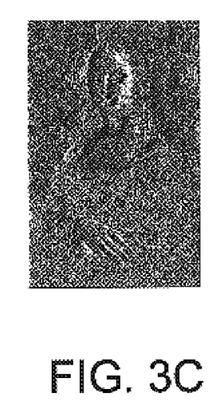
FIG. 3C depicts images used for testing false alarm probability computations, a four rank transform of the image shown in FIG. 3A.

| a | b |
|---|---|
| c | d |

, then some of the possible 24 ranking orders are (a,b,c,d), (d,c,b,a), and (b,a,d,c). These rankings were arbitrarily assigned to one of four different groups, with six rankings in each group. The upper left pixel of the window in the original image was replaced with this group number, giving the image the same set of four values as the iid random image. In fact, the probabilities of the pixel values are also the same, because the iid image was generated after the rank transformed image to have approximately the same global histogram. Since the iid and rank transformed image both are four-valued, m=4 for this test.

An arbitrary prototype histogram $H_p$=(34,22,16,28) was picked. Choosing $\alpha$=0.9 gives a target histogram of $\alpha H_p$=(30,20,15,25). Any histogram in the test images, all of whose entries equal or exceed the corresponding entries in $\alpha H_p$ is considered a false alarm.

Figure 4:
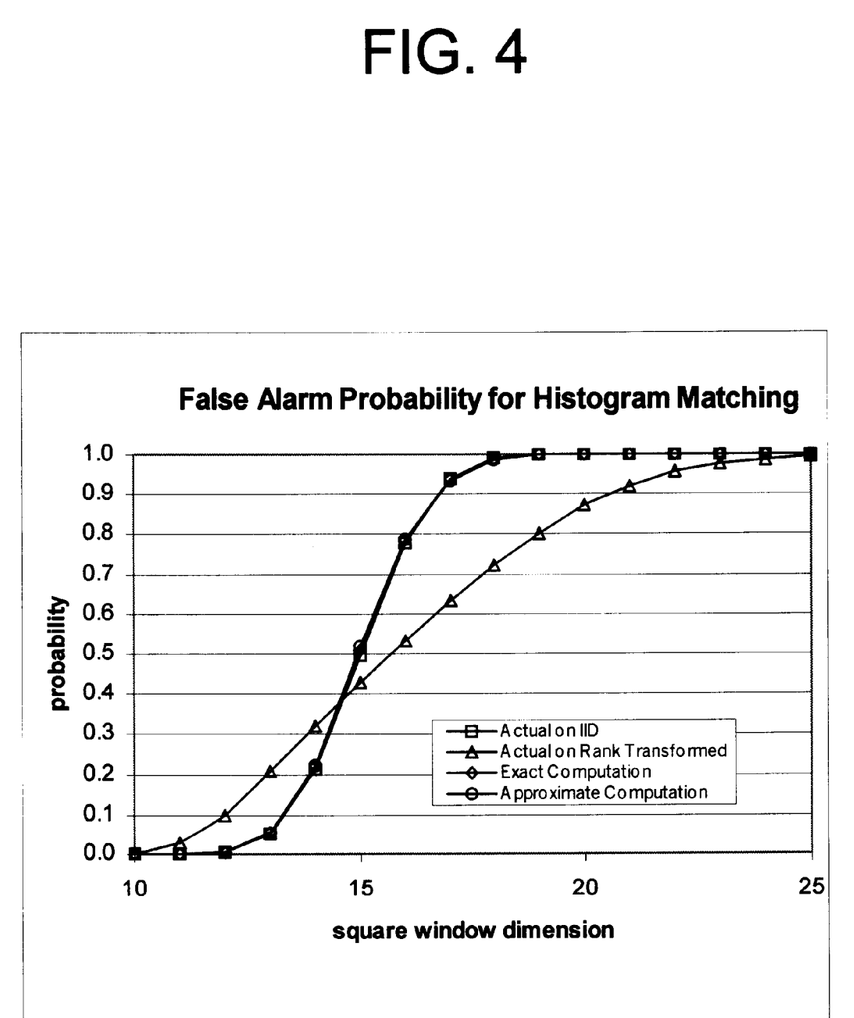
FIG. 4 is a chart showing the results of the false alarm tests wherein the exact and approximate computations overlapped almost exactly.

The target histogram was searched for using different sized, overlapping, square windows ranging in size from 10×10 to 20×20. In general, it is expected that the false alarm rate increases with increasing window size. False alarm rates were computed for the two images three different ways. Images were scanned through doing actual comparisons for ground truth, the exact analysis where summed probabilities from the multinomial distribution were used, and the approximate analysis was used where multivariate normals were numerically integrated using Mathematica's® standard numerical integration function. The results are shown in FIG. 4.

It was found that for the iid image, the false alarm rate based on the exact analysis and approximate analysis overlapped the ground truth almost exactly. This verifies the mathematical modeling of the exact analysis and justifies the approximation. Since the rank transformed image had the same pixel probabilities as the iid image, the exact and approximate analysis gave exactly the same numbers as for the iid image. It can be seen that the ground truth for the rank transformed image is close to the analysis, but differs somewhat. This is attributed to the fact that the rank transformed image is not iid, as was assumed in the analysis. Even though the analysis does not predict the rank transformed image's false alarm rate exactly, it still gives a good estimate, the most important aspect of which is that square search windows below size 11×11 can be safely expected to give very few false alarms.

In summary, in histogram matching, it is important to pick a set of operating parameters that will minimize the probability of a false alarm. To enable this choice, the system and method according to the present invention computes the false alarm probability, both in an exact way by summing multinomial probabilities and approximately by integrating a multivariate normal distributions. Testing shows that the exact and approximate analysis give nearly the same result, and that this result accurately predicts the false alarm probability for iid images and is close for an image that deviates from iid.

While the invention has been described in detail by specific reference to preferred embodiments thereof, it is understood that variations and modifications thereof may be made without departing from the true spirit and scope of the invention.

REFERENCES

[1] M. J. Swain and D. H. Ballard, "Color Indexing", *International Journal of Computer Vision*, Vol. 7, pp 11–32, 1991.

[2] I. V. V. Vinod and H. Murase, "Focused Color Intersection with Efficient Searching for Object Extraction", *Pattern Recognition*, Vol. 30, pp. 1787–1797, 1997.

[3] O. Kempthorne and L. Folks, *Probability, Statistics and Data Analysis,* Ames, Iowa: Iowa State University Press, 1971.

Wherefore, having thus described the present invention, what is claimed is:

1. A process for determining the overall false alarm probability when using histogram matching comprising the process actions of:

generating a prototype histogram from a model of an item being sought in an environment;

determining the set of all possible test histograms that can be formed from the environment given a prescribed number of bins and a maximum count for the bins;

determining the subset of test histograms from said set of all possible test histograms, which will cause a false alarm, said false alarm occurring when a histogram formed from the environment matches the prototype histogram when that histogram does not actually represent the model of the item being sought;

determining the probability of occurrence of each individual test histogram that will cause a false alarm in said subset; and summing the individual false alarm probabilities of occurrence of all histograms in said subset of test histograms which will cause a false alarm to establish the overall false alarm probability.

2. The process of claim 1 wherein the process action of determining the set of all possible histograms, comprises the process actions of:

determining the number of all possible histograms; and listing all the possible histograms.

3. The process of claim 2 wherein the process action of determining the number of all possible histograms further comprises the process actions of:

generating a first term by multiplying together a set of numbers derived by respectively adding an index value varying from 1 to a value equal to the number of bins minus 1, to the maximum count;

generating a second term by taking the inverse of the factorial of the number of bins minus 1; and multiplying the first term by the second term to determine the number of all of the possible histograms.

4. The process of claim 2 wherein the process action of listing all the possible histograms comprises a process action of generating a list of all the possible combinations of the counts in each bin.

5. The process of claim 1, wherein the process action of determining the subset of said set of all possible test histograms that will cause a false alarm, comprises an action of determining the similarity between all test histograms and the prototype histogram.

6. The process of claim 5 wherein the process action of determining the similarity further comprises the actions of:

determining how many counts in the prototype histogram the test histogram accounts for; and if the counts in the prototype histogram that the test histogram accounts for exceeds a prescribed threshold then the prototype histogram and the test histogram are considered similar enough to declare said item being sought in said environment to be found.

7. The process of claim 6 wherein the prescribed threshold is exceeded when said test histogram accounts for a substantial fraction of the counts in the prototype histogram.

8. The process of claim 7 wherein a false alarm occurs when the prescribed threshold is exceeded and the item being sought does not really exist in said test histogram.

9. The process of claim 1, wherein the environment is made up of elements that are independent from each other and identically distributed.

10. The process of claim 9 wherein the process action of determining the probability of occurrence of each individual test histogram that will cause a false alarm comprises the process actions of:

approximating the probability of occurrence of each histogram in the environment given the prescribed number of bins and a maximum count for the bins using a multinomial distribution analysis; and assigning the probability of occurrence determined for each histogram in the environment as the probability of occurrence of each of the histograms that were determined to cause a false alarm.

11. The process of claim 9 wherein the process action of determining the probability of occurrence of each individual test histogram further comprises:

approximating the probability of occurrence of each histogram in the environment given the prescribed number of bins and a maximum count for the bins by integrating a multivariate normal; and assigning the probability of occurrence determined for each histogram in the environment as the probability of occurrence of each of the histograms that were determined to cause a false alarm.

12. The process of claim 1 further comprising a process action of adjusting the number of bins and maximum count parameters to create the test histograms to optimize the overall false alarm probability.

13. A system for optimizing the overall false alarm probability when using histogram matching to recognize an object in an image of a scene comprising:

at least one general purpose computing device; and a computer program comprising program modules executable by the at least one computing device, wherein the at least one computing device is directed by the program modules of the computer program to, compute the false alarm rate for a given set of parameters, wherein said computation comprises, generating a prototype histogram from a model image depicting an object being sought in an image, determining the set of all possible test histograms that can be formed from a background image of the scene given a prescribed number of bins and a maximum pixel count for the bins, determining the subset, of test histograms from said set of all possible test histograms, which will cause a false alarm, said false alarm occurring when a histogram formed from the background image matches the prototype histogram when that histogram does not actually represent the object being sought, determining the probability of occurrence of each individual test histogram that will cause a false alarm in said subset, and summing the individual false alarm probabilities of occurrence of all histograms in said subset of test histograms which will cause a false alarm to establish the overall false alarm probability; and adjust the parameters to bring the false alarm rate down.

14. The system of claim 13 wherein the sub-module for determining the set of all possible histograms that can be formed from the background image of the scene, comprises sub-modules for:

determining the number of all possible histograms that can be formed from the background image of the scene; and listing all the possible histograms that can be formed from the background image of the scene that will cause a false alarm.

15. The system of claim 14 wherein the sub-module for determining the number of all possible histograms that can be formed from the background image of the scene further comprises sub-modules for:

generating a first term by multiplying together a set of numbers derived by respectively adding an index value varying from 1 to a value equal to the number of bins minus 1, to the maximum pixel count;

generating a second term by taking the inverse of the factorial of the number of bins minus 1; and multiplying the first term by the second term to determine all of the possible histograms.

16. The system of claim 14 wherein the sub-module for listing all the possible histograms that can be formed from the background image of the scene further comprises a sub-module for generating a list of all the possible combinations of the counts in each bin.

17. The system of claim 13, wherein the sub-module for determining the subset of said set of all possible test histograms that will cause a false alarm, further comprises a sub-module for determining the similarity between all test histograms and the prototype histogram.

18. The system of claim 17 wherein the sub-module for determining similarity further comprises sub-modules for:

determining how many pixel counts in the prototype histogram the test histogram accounts for via an intersection analysis; and if the pixel counts in the prototype histogram that the test histogram accounts for exceeds a prescribed threshold then the prototype histogram and the test histogram are considered similar enough to declare the object being sought in said image to be found.

19. The system of claim 18 wherein the prescribed threshold is exceeded when said test histogram accounts for a substantial fraction of the counts in the prototype histogram.

20. The system of claim 18 wherein a false alarm occurs when the prescribed threshold is exceeded and the item being sought does not really exist in said test histogram.

21. The system of claim 13, wherein the image is made up of pixels that are independent from each other and identically distributed.

22. The system of claim 21 wherein the sub-module for determining the probability of occurrence of each individual test histogram that will cause a false alarm comprises sub-modules for:

determining the probability of occurrence of each histogram in the environment given the prescribed number of bins and a maximum pixel count for the bins using a multinomial distribution analysis; and assigning the probability of occurrence determined for each histogram in the image as the probability of occurrence of each of the histograms that were determined to cause a false alarm.

23. The system of claim 21 wherein the sub-module for determining the probability of occurrence of each individual test histogram further comprises sub-modules for:

determining the probability of occurrence of each histogram in the environment given the prescribed number of bins and a maximum pixel count for the bins by integrating a multivariate normal; and assigning the probability of occurrence determined for each histogram in the image as the probability of occurrence of each of the histograms that were determined to cause a false alarm.

24. The system of claim 13 further comprising a sub-module for:

adjusting the number of bins and maximum pixel count parameters to create the test histograms to optimize the overall false alarm probability.

25. A computer-readable memory for optimizing the overall false alarm probability when using histogram matching to recognize an object in an image of a scene comprising:

a computer-readable storage medium; and a computer program comprising program modules stored in the storage medium, wherein the storage medium is so configured by the computer that it causes a computing device to, distort the pixels of a model image of the scene which contains the object being sought to approximate an image exhibiting substantially independent and identically distributed image, extract a portion of the distorted model image representing the object to create a distorted model image of the object and a distorted background image of the scene without the object, generate a prototype histogram from the distorted model image of the object given a prescribed number of bins and a maximum count for the bins, determine the set of all possible test histograms that can be formed from the distorted background image using the prescribed number of bins and the maximum count for the bins, determine the subset of test histograms from said set of all possible test histograms which will cause a false alarm, said false alarm occurring when a histogram formed from the distorted background image matches the prototype histogram when that histogram does not actually represent the object, determine the probability of occurrence of each individual test histogram that will cause a false alarm in said subset, and sum the individual false alarm probabilities of occurrence of all histograms in said subset of test histograms which will cause a false alarm to establish the overall false alarm probability.

26. The computer-readable memory of claim 25 wherein the program module for distort the pixels of a model image of the scene comprises the sub-modules for:

extracting overlapping windows of a prescribed size from the model image of the scene in a right-to-left, top-to-bottom pattern starting at the upper-left corner of the model image; and for each extracted window, sorting the pixel values of the pixels of the window into every possible combination thereof to produce a set of ranking orders, arbitrarily assigning each ranking order to one of a prescribed number of groups, assigning a unique identifier value to each group, identifying which group contains the ranking order matching that of the original extracted window in a right-to-left, top-to-bottom pattern, and assigning the identifier value associated with the identified group containing the ranking order matching that of the original extracted window to the pixel location in the model image corresponding to the upper-left pixel location of the extracted window.

27. The computer-readable memory of claim 26, wherein the prescribed window size is 2 by 2 pixels and the prescribed number of groups is four, thereby producing a four-value ranked transform version of the model image.

* * * * *